(12) United States Patent
Juncker et al.

(10) Patent No.: US 10,997,446 B2
(45) Date of Patent: May 4, 2021

(54) ENROLLMENT SCHEME FOR AN ELECTRONIC DEVICE

(71) Applicant: Fingerprint Cards AB, Gothenburg (SE)

(72) Inventors: Carsten Juncker, Herlev (DK); Klaus S. Andersen, Hvidovre (DK)

(73) Assignee: Fingerprint Cards AB, Göteborg (SE)

( * ) Notice: Subject to any disclaimer, the term of this patent is extended or adjusted under 35 U.S.C. 154(b) by 0 days.

(21) Appl. No.: 16/185,221

(22) Filed: Nov. 9, 2018

(65) Prior Publication Data

US 2019/0258882 A1 Aug. 22, 2019

(30) Foreign Application Priority Data

Feb. 16, 2018 (SE) .................................. 1850171-8

(51) Int. Cl.
*G06K 9/00* (2006.01)

(52) U.S. Cl.
CPC ..... *G06K 9/00926* (2013.01); *G06K 9/00013* (2013.01); *G06K 9/00221* (2013.01); *G06K 9/00604* (2013.01); *G06K 9/00892* (2013.01); *G06K 9/00912* (2013.01)

(58) Field of Classification Search
USPC ......................................................... 382/116
See application file for complete search history.

(56) References Cited

U.S. PATENT DOCUMENTS

| 8,734,296 | B1* | 5/2014 | Brumback | .............. | G06F 19/00 |
| | | | | | 482/8 |
| 2005/0229007 | A1* | 10/2005 | Bolle | ...................... | G06F 21/32 |
| | | | | | 713/186 |
| 2013/0227651 | A1 | 8/2013 | Schultz et al. | | |
| 2015/0071508 | A1 | 3/2015 | Boshra | | |
| 2015/0186706 | A1* | 7/2015 | Pierce | ..................... | G06F 3/041 |
| | | | | | 382/124 |
| 2016/0105285 | A1* | 4/2016 | Jakobsson | ............. | H04L 9/3231 |
| | | | | | 713/186 |
| 2016/0154991 | A1 | 6/2016 | Berini et al. | | |
| 2016/0203306 | A1 | 7/2016 | Boshra | | |
| 2017/0124392 | A1 | 5/2017 | Gu et al. | | |
| 2017/0147772 | A1* | 5/2017 | Meehan | ................. | G16H 40/63 |
| 2017/0374065 | A1* | 12/2017 | Shtraym | ............. | H04L 63/0861 |
| 2018/0276672 | A1* | 9/2018 | Breed | ................ | G06K 9/00604 |
| 2019/0019024 | A1* | 1/2019 | Zhou | ................... | G06K 9/00919 |
| 2019/0083007 | A1* | 3/2019 | Jagannathan | ........ | A61B 5/6897 |

FOREIGN PATENT DOCUMENTS

KR 101814167 B1 1/2018

OTHER PUBLICATIONS

Final Notice from the Swedish Patent and Registration Office dated Sep. 14, 2018 for Swedish Patent Application No. 1850171-8, 30 pages.
Swedish Search Report dated Sep. 14, 2018 for Swedish Application No. 1850171-8, filed Feb. 16, 2018, 2 pages.

* cited by examiner

*Primary Examiner* — Jerome Grant, II
(74) *Attorney, Agent, or Firm* — RMCK Law Group, PLC

(57) ABSTRACT

The present disclosure relates to an electronic device comprising at least a first and a second biometric sensor arrangement, wherein the second biometric sensor arrangement being different from the first biometric sensor arrangement. The present disclosure also relates to a method for enrolling a user of such an electronic device and to a corresponding computer program product.

7 Claims, 8 Drawing Sheets

ENROLLMENT SCHEME FOR AN ELECTRONIC DEVICE

CROSS-REFERENCE TO RELATED APPLICATIONS

This application claims priority to Swedish Patent Application No. 1850171-8, filed on Feb. 16, 2018. The disclosure of the above application is hereby incorporated by reference in its entirety.

TECHNICAL FIELD

The present disclosure relates to an electronic device comprising at least a first and a second biometric sensor arrangement, wherein the second biometric sensor arrangement being different from the first biometric sensor arrangement. The present disclosure also relates to a method for enrolling a user of such an electronic device and to a corresponding computer program product.

BACKGROUND

Various types of biometric systems are used more and more in order to provide for increased security for accessing an electronic device, thereby providing an enhanced user convenience. In particular fingerprint sensors have been successfully integrated in such devices, for example, thanks to their small form factor, high performance, and user acceptance.

However, since there is a desire for further improving the usability as well as security for the electronic device, it has been suggested to integrate and make use of more than a single biometric system with the electronic device. An example of such an implementation is disclosed in US20050229007, where multiple types of biometric data, for example, fingerprints, facial scan, visual scan, iris scan, voice scan, or the like, may be detected simultaneously and verified to be from the same user.

However, before being able to verify the user it is necessary to first perform an enrollment process for collecting the user's biometric data to be later used for the verification. Such an enrollment process typically involves the acquisition of multiple biometric samples. When the case of enrolling the users fingerprint, the user will need to arrange his/her finger in different positions at e.g. a fingerprint sensor, and a series of fingerprint images will be acquired. As is well known, such an enrollment process is tedious and thus tiresome for the user. As would be readily understood, enrolling the user with more than a single biometric system, such as is exemplified in US20050229007, would further increase the burden on the user, possibly preventing the users from utilizing all provided biometric systems comprised with the device.

Accordingly, there appears to be room for further improvement in regards to the enrollment scheme to be used with an electronic device comprising more than a single biometric system.

SUMMARY

According to an aspect of the present disclosure, it is therefore provided an electronic device, comprising a first biometric sensor arrangement for acquiring a first set of a first type of biometric data of a user of the electronic device, a second biometric sensor arrangement for acquiring a second set of a second type of biometric data of the user of the electronic device, a user output interface, and processing circuitry connected to the first and the second biometric sensor arrangement and the user output interface, wherein the first and the second biometric sensor arrangement are positioned at the electronic device such that the first and the second set of biometric data may be simultaneously acquired, and the processing circuitry is configured to form an enrollment instruction to be presented to the user, wherein the instruction comprises a request for the user to interact with the first biometric sensor arrangement for providing biometric data, output the instruction to the user using the user output interface, simultaneously acquire the first and the second set of biometric data from the first and the second biometric sensor arrangement, respectively, form a first biometric template based on the acquired first set of biometric data, and form a second biometric template based on the acquired second set of biometric data.

The present disclosure is based upon the realization that a specifically adapted enrollment instruction typically relating to only the first biometric sensor arrangement indirectly may be used for impacting how the user interact with the electronic device in such a manner that also biometric data from the second biometric sensor arrangement may be acquired. In line with the present disclosure, the enrollment instruction relating to the first biometric sensor arrangement will thus allow the user to fully focus on performing necessary enrollment steps in regards to the first biometric sensor arrangement, while biometric data from the second biometric sensor arrangement is acquired in "the background".

An advantage with the present disclosure is that a reduced amount of time will be needed when enrolling the user with the type of electronic device comprising said at least first and second biometric sensor arrangement. In addition, since the user is focusing his attention to the first biometric sensor arrangement, the biometric data from the second biometric sensor arrangement will be captured during natural operation of the electronic device, possibly forming more natural operational biometric data that may enhance a future verification of the user.

In a non-limiting example, the enrollment instruction presented at the user output interface may be arranged in such a manner that while the user is occupied with reading instructions regarding enrollment by means of the first biometric sensor arrangement at correctly follows the presented instructions, the electronic device will acquire biometric data from the second biometric sensor arrangement for "silent enrollment" of the user by means of the second biometric sensor arrangement.

In line with the present disclosure, the expression stating that "the first and the second set of biometric data may be simultaneously acquired" should be interpreted broadly, meaning that the biometric data is acquired within the "same operational session", i.e. at least in a time wise conjunction to each other.

In an embodiment of the present disclosure, the first biometric sensor arrangement may comprise fingerprint sensing means configured for capturing fingerprint data of a fingerprint pattern of a finger of the user of the electronic device, wherein the fingerprint data represents the first set of biometric data. In such an implementation of the electronic device, the second biometric sensor arrangement may comprise means for capturing at least one facial feature data of the user, wherein the facial feature data represents the second set of biometric data.

In an alternative embodiment, the first biometric sensor arrangement may comprise means for capturing at least one facial feature data of the user, wherein the facial feature data represents the first set of biometric data. Correspondingly, in such an implementation the second biometric sensor arrangement may comprise fingerprint sensing means configured for capturing fingerprint data of a fingerprint pattern of a finger of the user of the electronic device, wherein the fingerprint data represents the second set of biometric data.

In a further alternative embodiment, both the first and the second biometric sensor arrangement may comprise means for capturing at least one (e.g. different) facial feature data of the user.

In a further embodiment of the present disclosure, it may be possible to include more than two separate biometric sensor arrangements.

In one embodiment the second biometric sensor arrangement is different from the first biometric sensor arrangement, i.e. two different types of hardware. However, it some alternative embodiments the same hardware may be used in different configurations for acquiring the first and the second set of biometric data.

The fingerprint sensing means may, as indicated above, be implemented using any kind of currently or future fingerprint sensing principles, including for example capacitive, optical, thermal or ultrasonic sensing technology. Within the context of the present disclosure, the expression "fingerprint pattern of a finger of the user" should be interpreted broadly and to include both a regular "visual image" of a fingerprint of a finger as well as a set of measurements relating to the finger when acquired using the fingerprint sensor. A plurality of fingerprint images may be subsequently acquired and fused together, where the resulting information is used as an input for determining the sets of features.

The means for capturing at least one facial feature data of the user may include different types of hardware adapted to acquire data relating to the face of the user. Such hardware may e.g. include a camera adapted to capture an image of the user. However, other type of hardware may be used, such as including laser, ultrasonic, etc. for forming a model of a facial feature of the user. It should be understood that the expression "facial feature data" should be interpreted broadly, e.g. relating to a shape of a part of the face of the user as well as the eye and/or iris of the user.

Accordingly, in a still further alternative embodiment, the first biometric sensor arrangement may comprise means for capturing at least one facial feature data of the user, wherein the facial feature data represents the first set of biometric data. In such an implementation the second biometric sensor arrangement may be selected to comprise means for specifically capturing information relating to an iris of the user, wherein the information relating to the iris of the user represents the second set of biometric data. As indicated above, at least a portion of the means (e.g. hardware) used for acquiring the least one facial feature data and the information relating to the iris of the user may be shared between the first and the second biometric sensor arrangement.

In an embodiment of the present disclosure, the user output interface comprises a display screen. Preferably, the instruction is to be presented at a location of an active area of the display screen defined in the vicinity of the means for capturing at least one facial feature data of the user, such that a gaze of the user is essentially coinciding with the position of the means for capturing at least one facial feature data of the user.

In an alternative embodiment, the fingerprint sensing means is configured to allow the fingerprint pattern of the user to be acquired throughout a majority of an area covered by the display screen. Accordingly, the instruction is presented at the display screen such that the user is requested to touch more than a single position of an active area of the display screen.

In an embodiment of the present disclosure, the electronic device is a mobile phone, a tablet or a laptop. The biometric sensor arrangements may for example be used by the user to unlock the electronic device, signing a transaction, etc.

According to the present disclosure, the processing circuitry is preferably an ASIC, a microprocessor or any other type of computing device for controlling the operation of the biometric sensor arrangements. As such, the processing circuitry may form an integral part of the biometric sensor arrangements. It may also be possible to use more than a single processing circuitry. However, the processing circuitry may also be a general control unit comprised with the electronic device, for example configured for controlling the overall operation of the electronic device.

According to another aspect of the present disclosure, there is provided a method of enrolling biometric data for a user using an electronic device, wherein the electronic device comprises a first biometric sensor arrangement for acquiring a first set of a first type of biometric data of a user of the electronic device, a second biometric sensor arrangement for acquiring a second set of a second type of biometric data of the user of the electronic device, a user output interface, and processing circuitry connected to the first and the second biometric sensor arrangement and the user output interface, wherein the first and the second sensor arrangement are positioned at the electronic device such that the first and the second set of biometric data may be simultaneously acquired, wherein the method comprises the steps of forming an enrollment instruction to be presented to the user, wherein the instruction comprises a request for the user to interact with the first biometric sensor arrangement for providing biometric data, presenting the instruction to the user using the user output interface, simultaneously acquiring the first and the second set of biometric data from the first and the second biometric sensor arrangement, respectively, forming a first biometric template based on the acquired first set of biometric data, and forming a second biometric template based on the acquired second set of biometric data. This aspect of the present disclosure provides similar advantages as discussed above in relation to the previous aspect of the present disclosure.

According to a further aspect of the present disclosure, there is provided a computer program product comprising a non-transitory computer readable medium having stored thereon computer program means for enrolling biometric data for a user using an electronic device, wherein the electronic device comprises a first biometric sensor arrangement for acquiring a first set of a first type of biometric data of a user of the electronic device, a second biometric sensor arrangement for acquiring a second set of a second type of biometric data of the user of the electronic device, a user output interface, and processing circuitry connected to the first and the second biometric sensor arrangement and the user output interface, wherein the first and the second sensor arrangement are positioned at the electronic device such that the first and the second set of biometric data may be simultaneously acquired, wherein the computer program product comprises code for forming an enrollment instruction to be presented to the user, wherein the instruction comprises a request for the user to interact with the first biometric sensor arrangement for providing biometric data, code for presenting the instruction to the user using the user output interface, code for simultaneously acquiring the first and the second set of biometric data from the first and the second biometric sensor arrangement, respectively, code for forming a first biometric template based on the acquired first set of biometric data, and code for forming a second biometric template based on the acquired second set of biometric data. Also this aspect of the present disclosure provides similar advantages as discussed above in relation to the previous aspects of the present disclosure.

As mentioned above, the processing unit is preferably an ASIC, a microprocessor or any other type of computing device. Similarly, a software executed by the processing unit for operating the presently disclosed functionality may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present disclosure will become apparent when studying the appended claims and the following description. The skilled addressee realizes that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
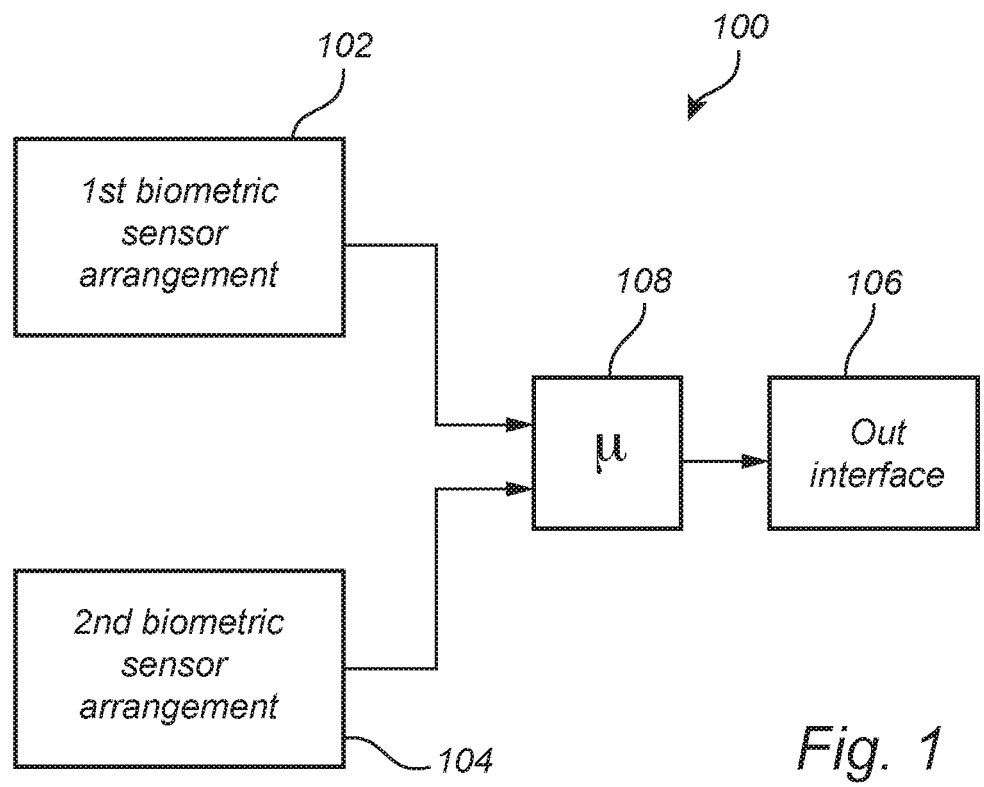
FIG. 1 schematically exemplifies an electronic device according to the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled user. Like reference characters refer to like elements throughout.

Directional terminology, such as "top", "bottom", "front", "back", "leading", "trailing", etc., is used with reference to the orientation of the Fig(s) being described. Because components of embodiments described herein can be positioned in a number of different orientations, the directional terminology is used for purposes of illustration only and is in no way limiting. When used in conjunction with layers of a display or device, the directional terminology is intended to be construed broadly.

In FIG. 1, there is schematically illustrated an example of the electronic device 100 according to the present disclosure. As is illustrated, the electronic device 100 comprises a first biometric sensor arrangement 102, a second biometric sensor arrangement 104, a user output interface 106 and a processing circuitry 108. The processing circuitry 108 is adapted to control the operation of the first 102 and the second 104 biometric sensor arrangements, as well as to form an enrollment instruction to be presented to the user using the output interface 106.

Figure 2:
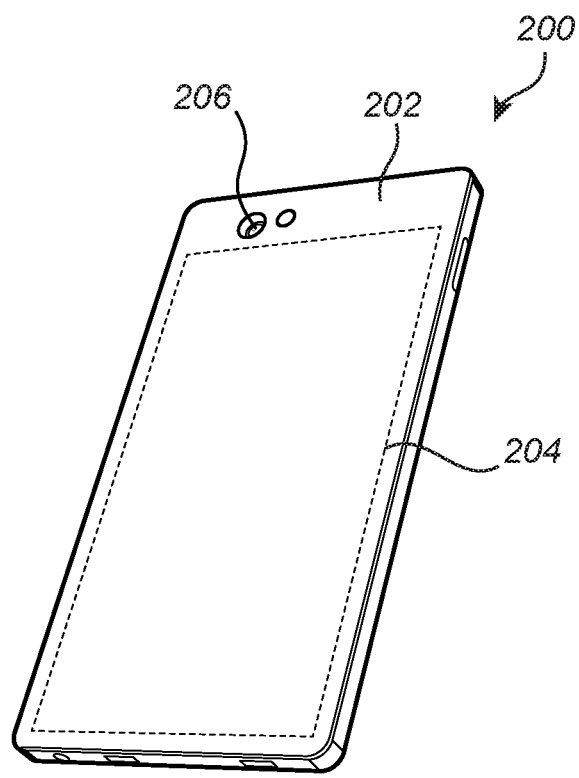
FIG. 2 is presents a possible implementation of the electronic device as shown in FIG. 1.

Turning now to FIG. 2, exemplifying a possible implementation of the electronic device 100 as a mobile phone 200. In the illustrated embodiment, the output interface 106 is provided by means of a touch screen display unit 202 comprised with the mobile phone 200. The touch screen display unit 202 is arranged at a front side of the mobile phone 200 and adapted to show a graphical user interface (GUI) to the user.

Furthermore, in the illustrated embodiment the first biometric sensor arrangement 102 comprises a fingerprint sensing system 204 adapted to capture fingerprint data of a fingerprint pattern of a finger of a user. The fingerprint sensing system 204 is arranged adjacently to the touch screen display unit 202 and adapted to allow capturing the user's fingerprints essentially throughout essentially the same active area as is provided by the display unit 202.

In the example presented in FIG. 2, the fingerprint sensing system 204 is exemplified as implemented to apply ultrasonic technology to acquire the fingerprint of the user. It should be understood that the concept as is provided in line with the present disclosure also or instead may be used in relation to fingerprint sensors employing different technologies, such as e.g. capacitive, optical, etc. as has been mentioned above. Accordingly, the concept according to the present disclosure is advantageous when used in relation to so called large area fingerprint sensors, having a functional (or active) area covering a major portion of e.g. an area of the touch screen display unit 202 as well as in relation to smaller fingerprint sensors, such as having a functional area only covering a minor portion of the touch screen display unit 202.

Additionally, in the illustrated embodiment the second biometric 104 comprises means for capturing at least one facial feature data of the user, exemplified with a camera 206 arranged at the front of the mobile phone 200, adapted to visually capture information of the face of the user when the user is looking at the front of the mobile phone 200. In the illustration presented in FIG. 2, the camera 206 is arranged at a top portion of the mobile phone 200.

Preferably and as is apparent for the skilled user, the mobile phone 200 further comprises a first antenna for WLAN/Wi-Fi communication, a second antenna for telecommunication, a microphone, a speaker, and a phone control unit. Further hardware elements are of course possibly comprised with the mobile phone. It should furthermore be noted that the present disclosure may be applicable in relation to any other type of electronic device, such as a laptop, a remote control, a tablet computer, or any other type of present or future similarly configured device.

Figure 3A:
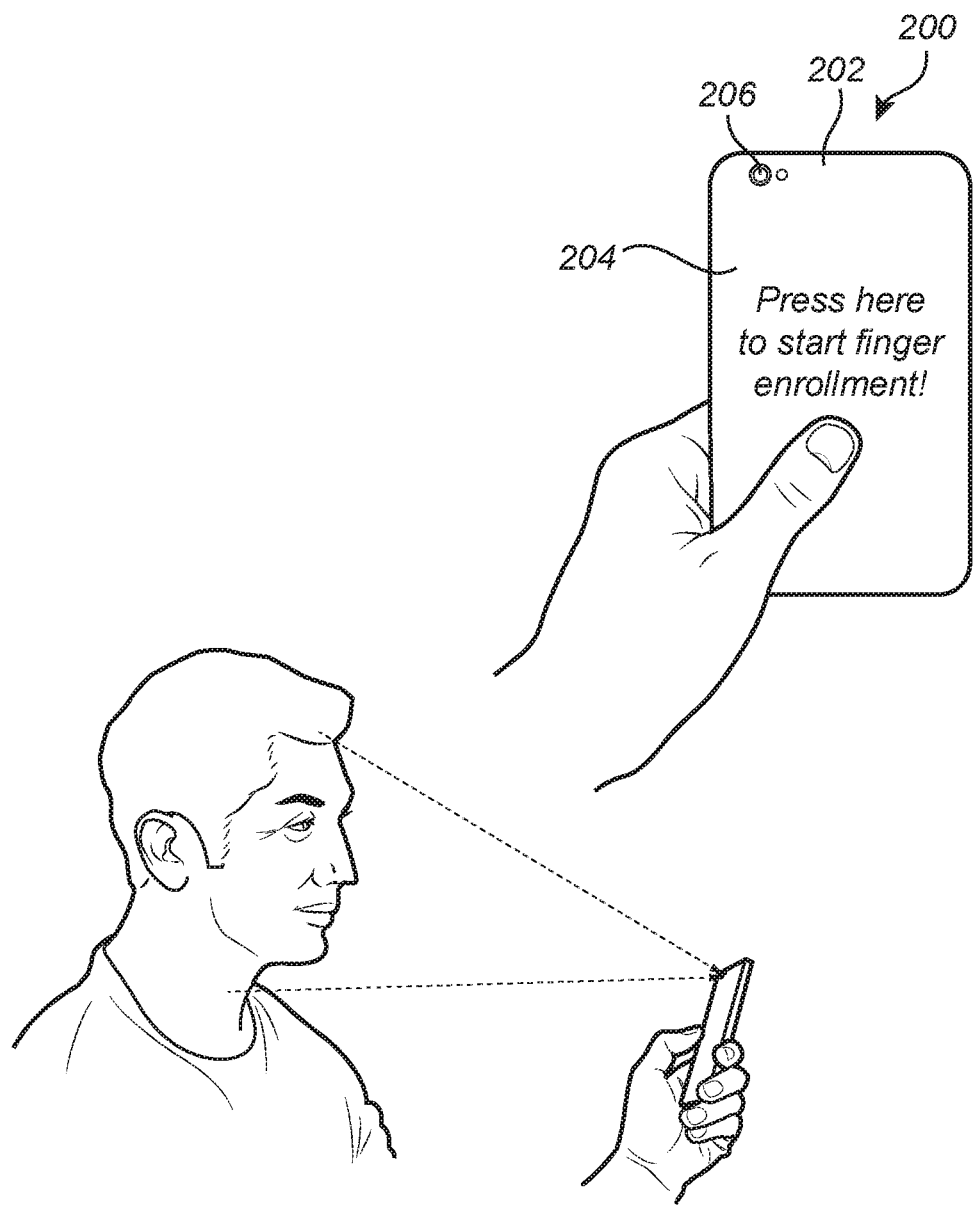
FIGS. 3A-3C show a possible user operation of the electronic device.
Figure 3B:
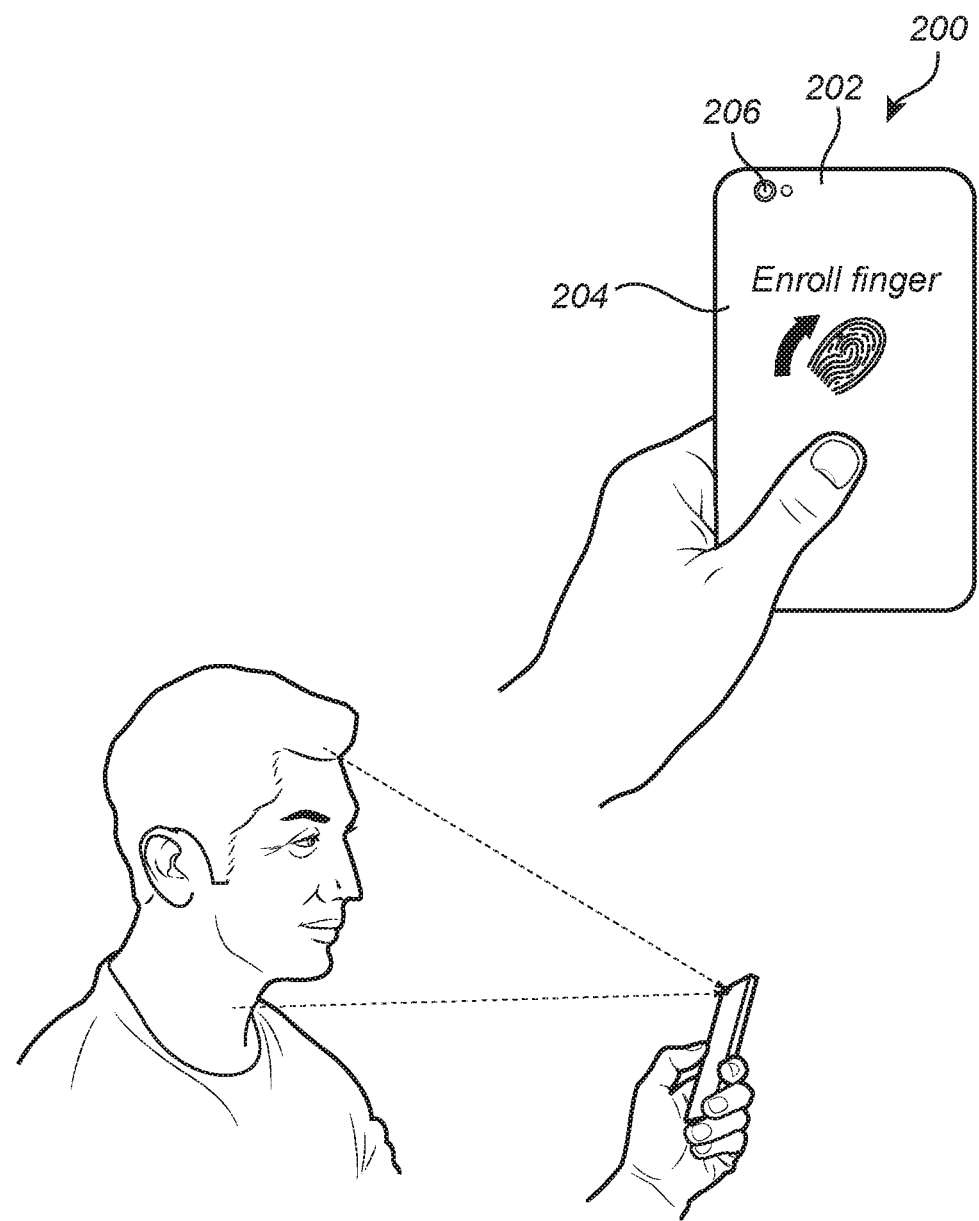
Figure 3C:
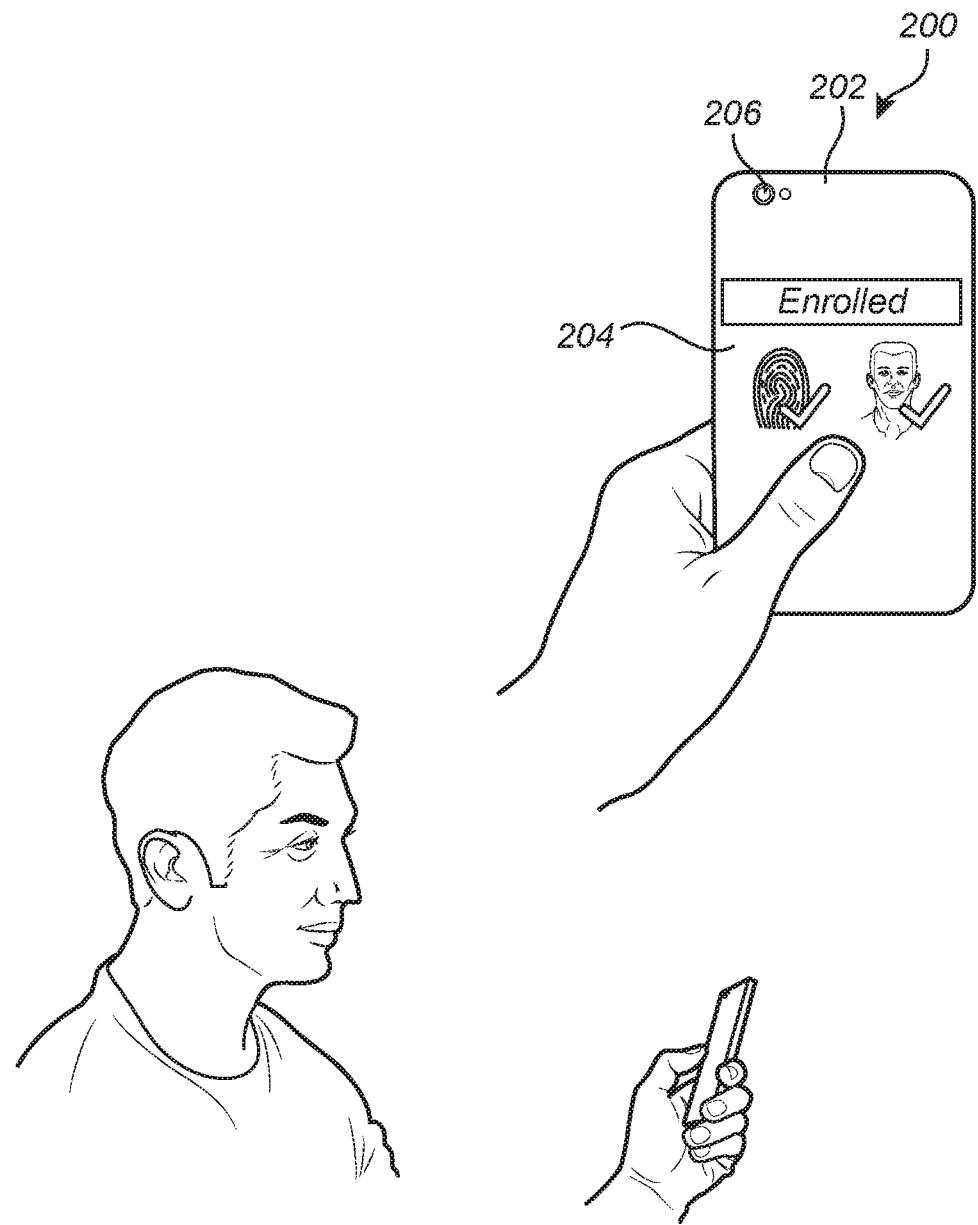
Figure 5:
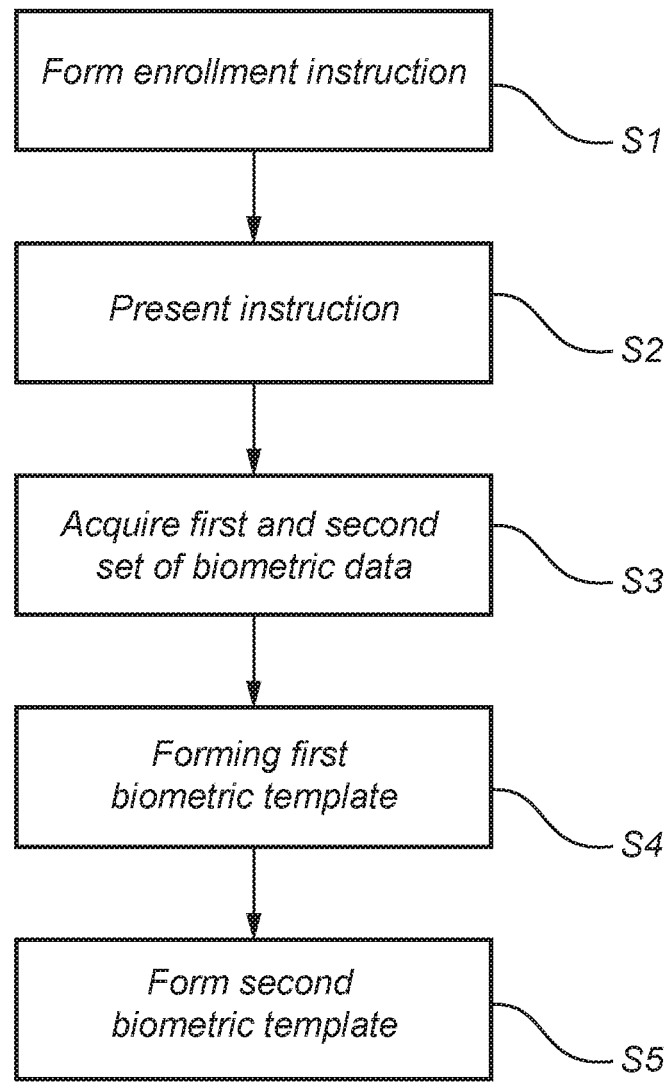
FIG. 5 is a flowchart illustrating the operation of the electronic device according to the present disclosure.

Turning now to FIGS. 3A-3C in conjunction with FIG. 5, showing a first example of user operation of the mobile phone 200. In this first example the enrollment instruction will be provided in relation to the fingerprint sensing system 204 and biometric data relating to a facial feature to be captured by the camera 206 will be performed in a "hidden manner".

Specifically, in FIGS. 3A and 3B the user is holding the mobile phone 200 in one of his hand. As pointed towards, this first example will mainly try to focus the user's attention towards fingerprint enrollment and accordingly the processing circuitry 108 will as a first step form, S1, an enrollment instruction that is presented, S2, to the user using the touch screen display unit 202. The enrollment instruction is in this example targeted towards how and where the user is to position his finger in relation to the fingerprint sensing system 204 for achieving the best possible capture of fingerprint data, i.e. in this example being the first set of biometric data.

At the same time as the user is focusing his attention to the instruction presented at the touch screen display unit 202, the camera 206 (i.e. in this example the means adapted for capturing at least one facial feature data of the user) will capture data relating to the face of the user, i.e. in this example being the second set of biometric data. As elaborated above, such a feature may for example comprise a facial shape or facially related relations, as well as data relating to e.g. the eye(s) or an iris of the user. The hidden capturing of the facial feature is in FIGS. 3A and 3B indicated by the dotted lines extending to the camera 206.

Accordingly, the processing circuitry 108 will, in parallel or in other ways in in timewise relation to presenting the instruction, capture/acquire/receive, S3, both the first and the second set of biometric data. The acquisition/reception may not necessarily be exactly simultaneously but is to be performed within the same enrollment session.

Once the first and the second set of biometric data has been acquired, it may be possible for the processing circuitry 108 to form, S4, a first biometric template and to form, S5, a second biometric template. The formation of the different templates may be based on any form of scheme suitable for use with the type of information comprised with first and the second set of biometric data. For example, in relation to the fingerprint data, the first biometric template may be formed based on fingerprint minutia extraction or any other form of suitable methodology, as is well known by the person skilled in the art. Correspondingly, in regards to the facial feature data of the user, the second biometric template may be formed based on identifiable facial features, such as facial landmarks, etc. comprised with the second set of biometric data. In a similar manner as above, any other form of suitable methodology may be used for such template formation, and is well known by the person skilled in the art.

It should be understood that more than a single instruction may be formed and presented to the user for acquiring the first (and the second) set of biometric data. That is, the enrollment scheme may be iterated for acquiring more than a single set of the first biometric data (as well as acquiring more than a single set of the second biometric data, in the "background").

Generally, once the first and the second biometric template have been formed, the user may for example be notified, as is exemplified in FIG. 3C. It should however be understood that in some situations e.g. the "main" enrollment scheme, such as the fingerprint enrollment as illustrated by the example shown in FIG. 3A-3C, may complete before the hidden enrollment scheme, such as e.g. the face/eye/iris enrollment scheme, has enough data for completion. In such a situation the user may be informed, using e.g. the touch screen display unit 202 about the fact that only the first biometric template has been formed but not the second biometric template (i.e. step S5 not yet completed). The user may then be given the option to proceed with the second biometric sensor enrollment (in this example the facial feature enrollment scheme). However, in such an embodiment the hidden enrollment may transition from a "passive" to an "active state", meaning that the user will be given one or a plurality of direct instructions for allowing acquisition of further sets of second biometric data to allow the formation of the second biometric template to be completed (the passive state meaning that the user will be given indirect instructions by means of instructing the user to interact with the first biometric sensor arrangement). Optionally the user may be allowed to reject the uncompleted enrollment, postpone the uncompleted enrollment (with e.g. a link/relation formed with the user), or allow the uncompleted enrollment to proceed further in the hidden manner (e.g. without receiving any further instructions).

Furthermore, once at least one of the first and the second biometric templates has been formed (enrollment scheme completed), the user may be notified that the corresponding biometric sensor arrangement may be used for further operation, such as for a future user authentication. The authentication may for example be used for unlocking the mobile phone 200 and/or for signing a transaction, etc.

Figure 4A:
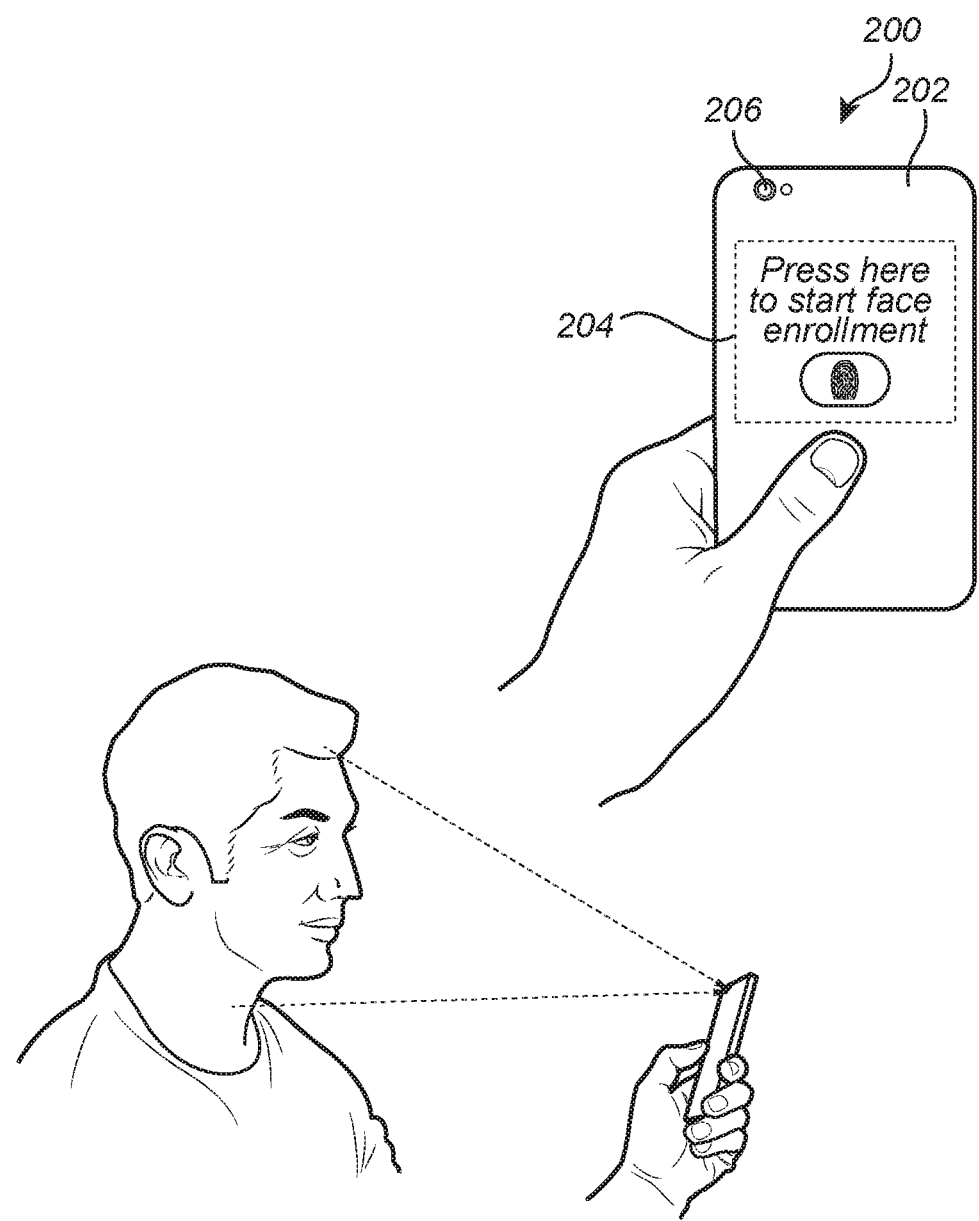
FIGS. 4A-4C presents an alternative user operation of the electronic device.
Figure 4B:
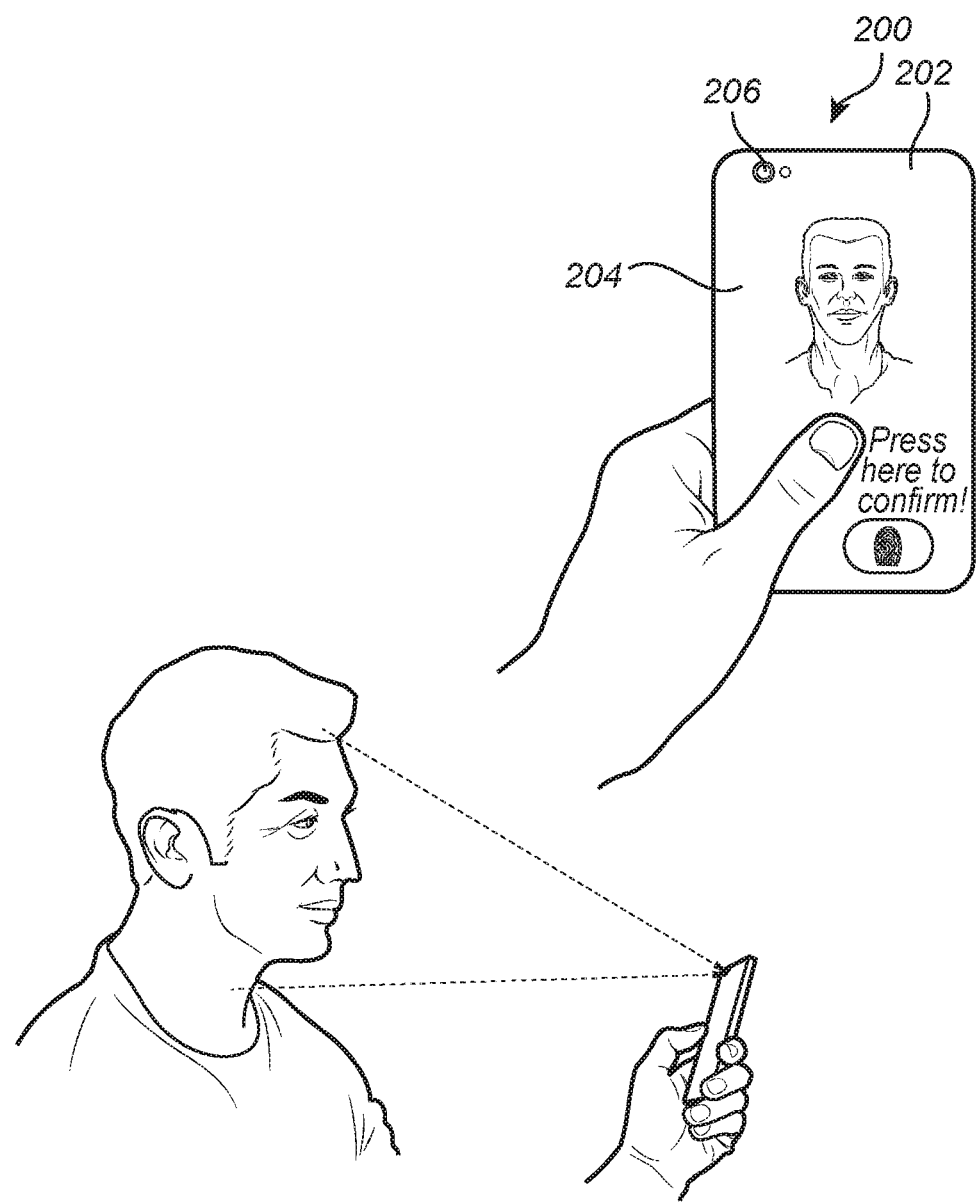

FIGS. 4A-4B shows a second alternative example of user operation of the mobile phone 200. Specifically, in the second example the enrollment instruction will be provided in relation to the facial features to be captured using the camera 206 and biometric data from the fingerprint sensing system 204 will be captured in the background/silent manner. Accordingly, in this exemplary embodiment the camera 206 will be defined as the first biometric sensor arrangement 102 and the fingerprint sensing system 204 will be defined as the second biometric sensor arrangement 104.

Figure 4C:
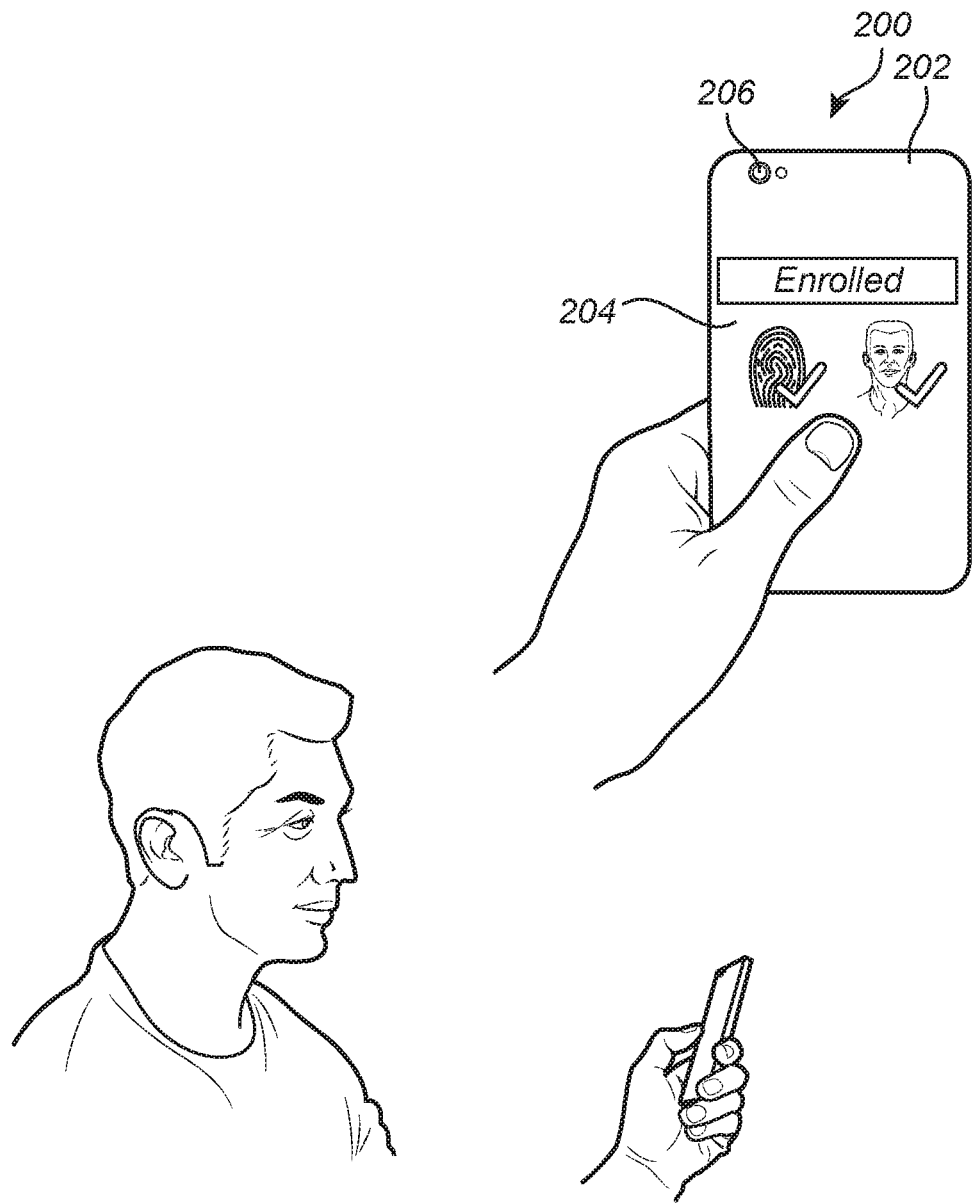

In a corresponding manner as discussed above in relation to FIGS. 3A-3C, the processing circuitry 108 will in relation to the second example as shown in FIGS. 4A-4C form a "main" enrollment instruction to be presented to the user by means of the touch screen display unit 202. The enrollment instruction is in this example targeted towards how the user is to position e.g. his face in relation to the camera 206 for achieving the best possible capture of facial feature data, i.e. in this example being the first set of biometric data.

The enrollment scheme as illustrated in FIGS. 4A-4C may include the formation and presentation of enrollment instructions that on the face of it is directed to "moving forward" in the enrollment of the facial features of the user. However, based on the fact that the fingerprint sensing system 204 is arranged adjacently to the touch screen display unit 202 and adapted to allow capturing the user's fingerprints essentially throughout essentially the same active area as is provided by the display unit 202, it may be possible to "force" the user to actively position his finger(s) at or adjacently to e.g. the surface of the fingerprint sensing system 204. Accordingly, it may be possible to capture the fingerprint data (i.e. in this case the second set of biometric data) in the mentioned hidden manner, e.g. without necessarily informing the user about the fact that fingerprint data is collected.

For example, as is illustrated in FIG. 4B, the user may be requested to confirm that a specifically captured image of the user is "correct", whereby the fingerprint sensing system 204 once the user makes such a confirmation may acquire suitable fingerprint data.

In a similar manner as discussed above, e.g. the facial feature enrollment may possibly be completed before the fingerprint enrollment. In such a situation the user may be allowed to proceed/reject/postpone/etc. the enrollment.

The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. An electronic device, comprising:
a first biometric sensor arrangement comprising a fingerprint sensor configured to acquire fingerprint data of a fingerprint pattern of a finger of a user of the electronic device;
a second biometric sensor arrangement comprising a sensor configured to acquire at least one type of facial feature data of the user of the electronic device;
a user output interface comprising a touch screen display unit, wherein the fingerprint sensor is arranged adjacently to the touch screen display unit and adapted to allow capturing the user's fingerprint data in an active area provided by the display unit, and
processing circuitry connected to the first and the second biometric sensor arrangement and the user output interface, wherein the first and the second sensor arrangement are positioned at the electronic device such that the fingerprint data and the at least one type of facial feature data may be simultaneously acquired, and the processing circuitry is configured to:
form an enrollment instruction to be presented to the user, wherein the instruction comprises a request for the user to interact with the fingerprint sensor for providing the fingerprint pattern of the user;
output the instruction to the user within the active area of the touch screen display unit;
acquire, simultaneously, the fingerprint data and the at least one type of facial feature data using the first and the second biometric sensor arrangement, respectively, while the user is interacting with the touch screen display unit in accordance with the instruction;
form a first biometric template based on the acquired fingerprint data, and
form a second biometric template based on the acquired at least one type of facial feature data.

2. The electronic device according to claim 1, wherein the instruction comprises a request for the user to only interact with the first biometric sensor arrangement for providing fingerprint data.

3. The electronic device according to claim 1, wherein sensor of the second biometric sensor arrangement is arranged to acquire information relating to an iris of the user, wherein the at least one type of facial feature data is provided in relation to the iris of the user.

4. The electronic device according to claim 1, wherein the fingerprint sensor is employing at least one of optical, thermal, and ultrasonic sensing technology.

5. The electronic device according to claim 1, wherein the electronic device is a mobile phone, a tablet or a laptop.

6. A method of enrolling biometric data for a user using an electronic device, wherein the electronic device comprises:
a first biometric sensor arrangement comprising a fingerprint sensor configured to acquire fingerprint data of a fingerprint pattern of a finger of a user of the electronic device;
a second biometric sensor arrangement comprising a sensor configured to acquire at least one type of facial feature data of the user of the electronic device;
a user output interface comprising a touch screen display unit, wherein the fingerprint sensor is arranged adjacently to the touch screen display unit and adapted to allow capturing the user's fingerprint data in an active area provided by the display unit, and
processing circuitry connected to the first and the second biometric sensor arrangement and the user output interface,
wherein the first and the second sensor arrangement are positioned at the electronic device such that the fingerprint data and the at least one type of facial feature data may be simultaneously acquired,
wherein the method comprises the steps of:
forming an enrollment instruction to be presented to the user, wherein the instruction comprises a request for the user to interact with the fingerprint sensor for providing the fingerprint pattern of the user;
presenting the instruction to the user within the active area of the touch screen display unit;
acquiring, simultaneously, fingerprint data and the at least one type of facial feature data using the first and the second biometric sensor arrangement, respectively, while the user is interacting with the touch screen display unit in accordance with the instruction;
forming a first biometric template based on the acquired fingerprint data, and forming a second biometric template based on the acquired at least one type of facial feature data.

7. A computer program product comprising a non-transitory computer readable medium having stored thereon computer program means for enrolling biometric data for a user using an electronic device, wherein the electronic device comprises:
- a first biometric sensor arrangement comprising a fingerprint sensor configured to acquire fingerprint data of a fingerprint pattern of a finger of a user of the electronic device;
- a second biometric sensor arrangement comprising a sensor configured to acquire at least one type of facial feature data of the user of the electronic device;
- a user output interface comprising a touch screen display unit, wherein the fingerprint sensor is arranged adjacently to the touch screen display unit and adapted to allow capturing the user's fingerprint data in an active area provided by the display unit, and
- processing circuitry connected to the first and the second biometric sensor arrangement and the user output interface,
- wherein the first and the second sensor arrangement are positioned at the electronic device such that the fingerprint data and the at least one type of facial feature data may be simultaneously acquired,
- wherein the computer program product comprises:
  - code for forming an enrollment instruction to be presented to the user, wherein the instruction comprises a request for the user to interact with fingerprint sensor for providing the fingerprint pattern of the user;
  - code for presenting the instruction to the user within the active area of the touch screen display unit;
  - code for acquiring, simultaneously, the fingerprint data and the at least one type of facial feature data using the first and the second biometric sensor arrangement, respectively, while the user is interacting with the touch screen display unit in accordance with the instruction;
  - code for forming a first biometric template based on the acquired fingerprint data, and
  - code for forming a second biometric template based on the acquired at least one type of facial feature data.

* * * * *